(12) United States Patent
Elony et al.

(10) Patent No.: US 8,152,959 B2
(45) Date of Patent: Apr. 10, 2012

(54) EMBOSSED MULTI-PLY FIBROUS STRUCTURE PRODUCT

(75) Inventors: Ahmed Kamal Elony, Cincinnati, OH (US); Osman Polat, Montgomery, OH (US); Jeffrey Glen Sheehan, Cincinnati, OH (US); Markus Wilhelm Altmann, Cincinnati, OH (US); Ward William Ostendorf, West Chester, OH (US); Kevin Mitchell Wiwi, West Chester, OH (US); Steven Lee Barnholtz, West Chester, OH (US); Douglas Jay Barkey, Maineville, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 1005 days.

(21) Appl. No.: 11/799,636

(22) Filed: May 2, 2007
(Under 37 CFR 1.47)

(65) Prior Publication Data
US 2007/0272381 A1 Nov. 29, 2007

Related U.S. Application Data

(60) Provisional application No. 60/808,371, filed on May 25, 2005.

(51) Int. Cl.
*B31F 1/07* (2006.01)
*D21H 27/30* (2006.01)
(52) U.S. Cl. ........ 162/117; 162/123; 162/125; 428/156; 428/172; 156/209
(58) Field of Classification Search .................. 162/109, 162/117, 123–133, 204–206; 428/153, 156, 428/172, 340; 156/209, 219, 183
See application file for complete search history.

(56) References Cited

U.S. PATENT DOCUMENTS

| | | | |
|---|---|---|---|
| D154,696 S | 8/1949 | Giesler, Sr. et al. | |
| 3,775,231 A | 11/1973 | Thomas | |
| 4,483,728 A * | 11/1984 | Bauernfeind | 156/209 |
| 4,529,480 A | 7/1985 | Trokhan | |
| 4,671,983 A * | 6/1987 | Burt | 428/179 |
| 5,275,700 A * | 1/1994 | Trokhan | 162/358.1 |
| 5,334,289 A | 8/1994 | Trokhan et al. | |
| 5,364,504 A | 11/1994 | Smurkoski et al. | |
| 5,374,468 A | 12/1994 | Babinsky et al. | |
| 5,397,435 A * | 3/1995 | Ostendorf et al. | 162/112 |
| 5,436,057 A | 7/1995 | Schulz | |
| 5,437,766 A * | 8/1995 | Van Phan et al. | 162/127 |
| 5,443,691 A | 8/1995 | Phan et al. | |
| 5,520,778 A | 5/1996 | Sawdai | |
| 5,573,830 A | 11/1996 | Schulz | |
| 5,620,776 A | 4/1997 | Schulz | |
| 5,679,222 A | 10/1997 | Rasch et al. | |
| 5,709,775 A | 1/1998 | Trokhan et al. | |
| 5,804,281 A | 9/1998 | Phan et al. | |
| 5,830,558 A * | 11/1998 | Barnholtz | 428/171 |
| 5,846,379 A * | 12/1998 | Ampulski et al. | 162/109 |
| 5,846,636 A * | 12/1998 | Ruppel et al. | 428/154 |
| 5,900,114 A * | 5/1999 | Brown et al. | 162/117 |
| 5,904,811 A * | 5/1999 | Ampulski et al. | 162/117 |
| 5,906,711 A * | 5/1999 | Barnholtz | 162/132 |
| D410,337 S | 6/1999 | Dwiggins et al. | |
| 5,919,556 A * | 7/1999 | Barnholtz | 428/218 |
| 5,922,439 A * | 7/1999 | Bredenick et al. | 428/154 |
| 6,030,690 A * | 2/2000 | McNeil et al. | 428/156 |
| 6,039,839 A | 3/2000 | Trokhan et al. | |
| 6,086,715 A * | 7/2000 | McNeil | 162/132 |
| 6,106,928 A * | 8/2000 | Laurent et al. | 428/152 |
| 6,113,723 A * | 9/2000 | McNeil et al. | 156/209 |
| D441,541 S | 5/2001 | Greenfield et al. | |
| D450,934 S | 11/2001 | Duritsch et al. | |
| 6,340,413 B1 * | 1/2002 | Nilsson et al. | 162/361 |
| D453,421 S | 2/2002 | Greenfield et al. | |
| D458,033 S | 6/2002 | Cassingham | |
| 6,464,831 B1 | 10/2002 | Trokhan et al. | |
| D472,057 S | 3/2003 | Cassingham | |
| 6,576,090 B1 | 6/2003 | Trokhan et al. | |
| 6,576,091 B1 | 6/2003 | Cabell et al. | |
| 6,602,577 B1 | 8/2003 | Ostendorf et al. | |
| 6,610,173 B1 * | 8/2003 | Lindsay et al. | 162/109 |
| 6,660,129 B1 | 12/2003 | Cabell et al. | |
| 6,660,362 B1 * | 12/2003 | Lindsay et al. | 428/131 |
| 6,896,767 B2 * | 5/2005 | Wilhelm | 162/117 |
| D508,613 S | 8/2005 | Knobloch et al. | |
| D514,779 S | 2/2006 | Birkenstock | |
| 6,998,017 B2 * | 2/2006 | Lindsay et al. | 162/109 |
| D516,822 S | 3/2006 | Enderby | |
| 7,195,810 B1 * | 3/2007 | Schmidt et al. | 428/156 |
| D546,071 S * | 7/2007 | Barkey et al. | D5/57 |
| 7,311,800 B2 * | 12/2007 | Russell et al. | 162/117 |

(Continued)

FOREIGN PATENT DOCUMENTS

| | | |
|---|---|---|
| EP | 0938609 | 1/1999 |
| GB | 2 255 745 | 11/1992 |
| WO | WO 94/04750 | 3/1994 |
| WO | WO 94/06623 | 3/1994 |
| WO | WO 94/23128 | 10/1994 |
| WO | WO 99/14425 | 3/1999 |
| WO | WO 99/39050 | 8/1999 |
| WO | WO 2005080677 A2 * | 9/2005 |
| WO | WO 2006133390 A2 * | 12/2006 |
| WO | WO 2007130541 A2 * | 11/2007 |

*Primary Examiner* — José A Fortuna
(74) *Attorney, Agent, or Firm* — Roddy M. Bullock; Betty J. Zea

(57) ABSTRACT

A multi-ply fibrous structure product having two or more plies of fibrous structure where at least one of the plies has a plurality of domes formed during the papermaking process and there are from about 10 to about 1000 domes per square inch of the product. At least one of the plies of the multi-ply fibrous structure has a plurality of embossments thereon with a total embossment area of from about 3% to about 15%. The embossments may be arranged such that they define non-geometric foreground patterns of unembossed cells.

16 Claims, 7 Drawing Sheets

U.S. PATENT DOCUMENTS

| | | | |
|---|---|---|---|
| 7,338,700 B2* | 3/2008 | McKenna et al. | 428/174 |
| RE40,724 E* | 6/2009 | Barnholtz | 428/218 |
| 2003/0111169 A1* | 6/2003 | Baggot et al. | 156/251 |
| 2004/0020614 A1* | 2/2004 | Lindsay et al. | 162/109 |
| 2004/0045685 A1* | 3/2004 | Horner et al. | 162/123 |
| 2004/0200590 A1* | 10/2004 | Wilhelm | 162/118 |
| 2005/0136225 A1* | 6/2005 | McKenna et al. | 428/174 |
| 2005/0148257 A1* | 7/2005 | Hermans et al. | 442/327 |
| 2005/0178513 A1 | 8/2005 | Russell et al. | |
| 2005/0241788 A1* | 11/2005 | Baggot et al. | 162/117 |
| 2005/0247416 A1* | 11/2005 | Forry et al. | 162/109 |
| 2005/0258576 A1* | 11/2005 | Forry et al. | 264/517 |
| 2006/0051560 A1* | 3/2006 | McKenna et al. | 428/174 |
| 2006/0088696 A1* | 4/2006 | Manifold et al. | 428/174 |
| 2006/0105660 A1* | 5/2006 | Barnholtz et al. | 442/286 |
| 2006/0278354 A1* | 12/2006 | Russell et al. | 162/117 |
| 2007/0126141 A1* | 6/2007 | Schmidt et al. | 264/119 |
| 2007/0256802 A1* | 11/2007 | Sheehan et al. | 162/123 |
| 2007/0272381 A1* | 11/2007 | Elony et al. | 162/123 |
| 2008/0268205 A1* | 10/2008 | Vogel et al. | 428/156 |
| 2009/0136722 A1* | 5/2009 | Nyangiro et al. | 428/195.1 |
| 2010/0239825 A1* | 9/2010 | Sheehan et al. | 428/172 |

* cited by examiner

EMBOSSED MULTI-PLY FIBROUS STRUCTURE PRODUCT

CROSS REFERENCE TO RELATED APPLICATION

This application claims the benefit of U.S. Provisional Application No. 60/808,371 filed May 25, 2006.

FIELD OF THE INVENTION

The present invention relates to multi-ply fibrous structure products, more specifically embossed multi-ply fibrous structure products having enhanced quilted appearance.

BACKGROUND OF THE INVENTION

Cellulosic fibrous structures are a staple of everyday life. Cellulosic fibrous structures are used as consumer products for paper towels, toilet tissue, facial tissue, napkins, and the like. The large demand for such paper products has created a demand for improved versions of the products and the methods of their manufacture.

Some consumers prefer embossed cellulosic fibrous structure products that have a softer, more three-dimensional, quilted appearance. Consumers also desire products having the appearance of relatively high caliper with aesthetically pleasing decorative patterns exhibiting a high quality cloth-like appearance. Such attributes, however, must be provided without sacrificing the other desired functional qualities of the product such as softness, absorbency, drape (flexibility/limpness) and bond strength between the plies.

Multiple ply cellulosic fibrous structures are known in the art of consumer products. Such products are cellulosic fibrous structures having more than one, typically two, plies superimposed in face-to-face relationship to form a laminate. It is known in the art to emboss sheets comprising multiple plies of tissue for aesthetic purposes and to maintain the plies in face-to-face relation during use. In addition, embossing can increase the surface area of the plies thereby enhancing their bulk and water holding capacity.

The prior art teaches that embossing improves appearance and generally improves (i.e., increases) the functional attributes of absorbency, compressibility, and bulk of the paper product. The prior art also teaches using various papermaking belts that can produce strong, soft, and absorbent paper products with textured surfaces. The combination of a textured surface made during the papermaking process with embossments on the surface of the paper can provide the consumer with the benefits of improved absorbency, softness, bond strength between plies, and overall quality of the paper product. Nonetheless, striking a balance between embossing and surface texture of the paper to create an aesthetically pleasing product without sacrificing the functional attributes of the product can be difficult.

Hence, the present invention unexpectedly provides an aesthetically pleasing tissue/towel product with high quality cloth-like appearance as well as an enhanced quilted appearance while maintaining absorbency, softness, and/or bond strength between the plies. The present invention provides a two (or more) ply structured fibrous structure with a dimpled/domed surface with cells having a specific surface area defined by embossments arranged in a non-geometric curved lattice.

SUMMARY OF THE INVENTION

The present invention relates to an embossed multi-ply fibrous structure product comprising two or more plies of fibrous structure wherein at least one of the plies has a plurality of domes formed during the papermaking process where the ply comprises from about 10 to about 1000 domes per square inch of the ply. At least one of the plies has a plurality of embossments thereon and has a total embossment area of from about 3% to about 15%. The embossments define one or more non-geometric foreground patterns having a plurality of unembossed cells and no two cells are defined by the same embossments.

An alternate embodiment of the present invention relates to an embossed multi-ply fibrous structure product comprising two or more plies of fibrous structure wherein at least one of the plies comprises a plurality of domes formed during the papermaking process and there are from about 10 to about 1000 domes per square inch of the product. At least one of the plies has a plurality of embossments thereon and has a total embossment area of from about 3% to about 15%. The embossments define a non-geometric latticework and non-geometric foreground pattern having a plurality of unembossed cells.

An alternate embodiment of the present invention relates to an embossed multi-ply fibrous structure product comprising two or more plies of fibrous structure wherein at least one of the plies comprises a plurality of domes formed during the papermaking process and there are from about 10 to about 1000 domes per square inch of the product. At least one of the plies has a plurality of embossments thereon having a total embossment area of from about 3% to about 15% and the embossments form a non-geometric latticework of repeating sets of horizontal S-waves and repeating sets of vertical S-waves.

BRIEF DESCRIPTION OF THE DRAWINGS

Without intending to limit the invention, embodiments are described in more detail below.

DETAILED DESCRIPTION OF THE INVENTION

Definitions

Figure 1A:
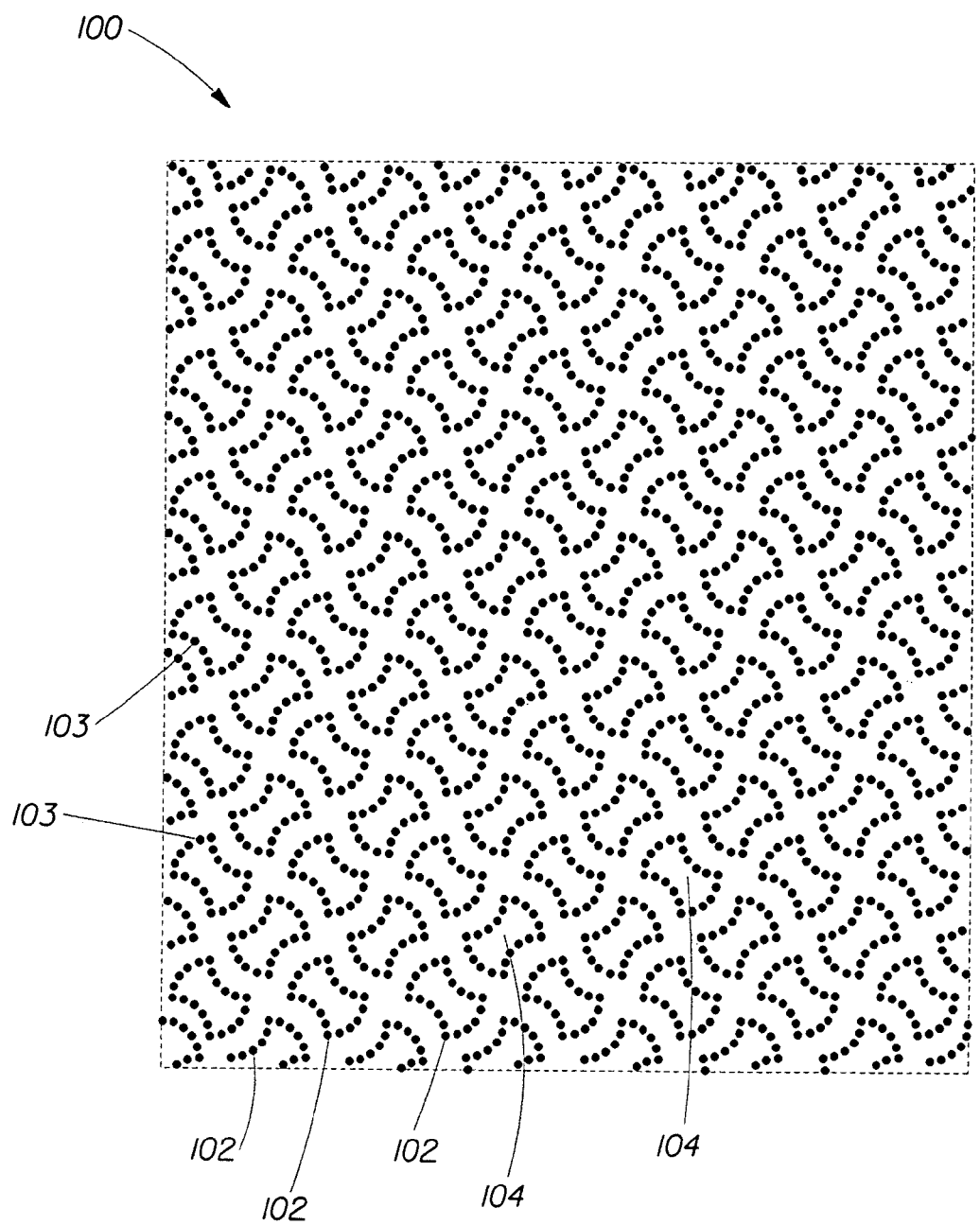
FIG. 1A is a fragmentary plan view of a multi-ply fibrous structure product displaying an embodiment of an embossment pattern in a latticework that define cells on the first ply made according to the present invention.

As used herein, "paper product" refers to any formed, fibrous structure products, traditionally, but not necessarily, comprising cellulose fibers. In one embodiment, the paper products of the present invention include tissue-towel paper products.

A "tissue-towel paper product" refers to creped and/or uncreped products comprising paper tissue or paper towel technology in general. Such products include, but not limited to, conventional felt-pressed or conventional wet-pressed tissue paper, pattern densified tissue paper, starch substrates, and high bulk, uncompacted tissue paper. Non-limiting examples of tissue-towel paper products include toweling, facial tissue, bath tissue, table napkins, and the like.

"Ply" or "Plies", as used herein, means an individual fibrous structure or sheet of fibrous structure, optionally to be disposed in a substantially contiguous, face-to-face relationship with other plies, forming a multi-ply fibrous structure. It is also contemplated that a single fibrous structure can effectively form two "plies" or multiple "plies", for example, by being folded on itself. In one embodiment, the ply has an end use as a tissue-towel paper product. A ply may comprise one or more wet-laid layers, air-laid layers, and/or combinations thereof. If more than one layer is used, it is not necessary for each layer to be made from the same fibrous structure. Further, the layers may or may not be homogenous within a layer. The actual makeup of a tissue paper ply is generally determined by the desired benefits of the final tissue-towel paper product, as would be known to one of skill in the art. The fibrous structure may comprise one or more plies of nonwoven materials in addition to the wet-laid and/or air-laid plies.

"Fibrous structure", as used herein, means an arrangement of fibers produced in any papermaking machine known in the art to create a ply of paper. "Fiber" means an elongate particulate having an apparent length greatly exceeding its apparent width. More specifically, and as used herein, fiber refers to such fibers suitable for a papermaking process.

"Basis Weight", as used herein, is the weight per unit area of a sample reported in lbs/3000 ft$^2$ or g/m$^2$.

"Machine Direction" or "MD", as used herein, means the direction parallel to the flow of the fibrous structure through the papermaking machine and/or product manufacturing equipment.

"Cross Machine Direction" or "CD", as used herein, means the direction perpendicular to the machine direction in the same plane of the fibrous structure and/or fibrous structure product comprising the fibrous structure.

"Densified", as used herein, means a portion of a fibrous structure product that is characterized by having a relatively high-bulk field of relatively low fiber density and an array of densified zones of relatively high fiber density. The high-bulk field is alternatively characterized as a field of pillow regions. The densified zones are alternatively referred to as knuckle regions. The densified zones may be discretely spaced within the high-bulk field or may be interconnected, either fully or partially, within the high-bulk field. One embodiment of a method of making a pattern densified fibrous structure and devices used therein are described in U.S. Pat. Nos. 4,529,480 and 4,528,239. In one embodiment of the present invention, the embossed multi-ply fibrous structure product comprises a densified area that is at least 2 times the density of another portion of the embossed multi-ply fibrous structure product.

"Non-densified", as used herein, means a portion of a fibrous structure product that exhibits a lesser density than another portion of the fibrous structure product. In one embodiment of the present invention, the embossed multi-ply fibrous structure product comprises a non-densified area that is less than 2 times the density of another portion of the embossed multi-ply fibrous structure product.

"Bulk Density", as used herein, means the apparent density of an entire fibrous structure product rather than a discrete area thereof.

"Embossing", as used herein, refers to the process of deflecting a relatively small portion of a cellulosic fibrous structure normal to its plane and impacting the projected portion of the fibrous structure against a relatively hard surface to permanently disrupt the fiber to fiber bonds.

"Repeating", as used herein, means the pattern is formed more than once.

"Discrete", as used herein, means the adjacent embossed sites are not contiguous.

"Essentially continuous", as used herein, means a region extending substantially throughout the fibrous structure in one or both of its principal directions.

"Non-geometric", as used herein, means not having rectilinear motifs or outlines having lines at right angles.

"Regular arrangement", as used herein, means a substantially ordered arrangement wherein the elements of the arrangement recur in an ordered pattern.

"Random arrangement", as used herein, means a substantially disordered arrangement wherein the elements of the arrangement do not recur in an ordered pattern.

"Latticework", as used herein, means a pattern of intersecting curvilinear segments or angles.

"Cell", as used herein, means a unit of a two- or three-dimensional array comprising an outline defined by a series of embossments surrounding a group of unembossed individual enclosures.

"Naturally occurring", as used herein, means that a fiber and/or a material is found in nature in its present form. An example of a naturally occurring fiber is a wood pulp fiber.

"Non-naturally occurring", as used herein and with respect to "non-naturally occurring fiber", means that the fiber is not found in nature in that form. In other words, some chemical processing of materials needs to occur in order to obtain the non-naturally occurring fiber. For example, a wood pulp fiber is a naturally occurring fiber, however, if the wood pulp fiber is chemically processed, such as via a lyocell-type process, a solution of cellulose is formed. The solution of cellulose may then be spun into a fiber. Accordingly, this spun fiber would be considered to be a non-naturally occurring fiber since it is not directly obtainable from nature in its present form.

Embossed Multi-Ply Fibrous Structure Product

The present invention is equally applicable to all types of consumer paper products such as paper towels, toilet tissue, facial tissue, napkins, and the like.

The present invention contemplates the use of a variety of paper making fibers, such as, natural fibers, synthetic fibers, as well as any other suitable fibers, starches, and combinations thereof. Paper making fibers useful in the present invention include cellulosic fibers commonly known as wood pulp fibers. Applicable wood pulps include chemical pulps, such as Kraft, sulfite and sulfate pulps, as well as mechanical pulps including, groundwood, thermomechanical pulp, chemically modified, and the like. Chemical pulps may be used in tissue towel embodiments since they are known to those of skill in the art to impart a superior tactical sense of softness to tissue sheets made there from. Pulps derived from deciduous trees (hardwood) and/or coniferous trees (softwood) can be utilized herein. Such hardwood and softwood fibers can be blended or deposited in layers to provide a stratified web.

Exemplary layering embodiments and processes of layering are disclosed in U.S. Pat. Nos. 3,994,771 and 4,300,981. Additionally, fibers derived from wood pulp such as cotton linters, bagesse, and the like, can be used. Additionally, fibers derived from recycled paper, which may contain any of all of the categories as well as other non-fibrous materials such as fillers and adhesives used to manufacture the original fibrous structure product may be used in the present web. In addition, fibers and/or filaments made from polymers, specifically hydroxyl polymers, may be used in the present invention. Non-limiting examples of suitable hydroxyl polymers include polyvinyl alcohol, starch, starch derivatives, chitosan, chitosan derivatives, cellulose derivatives, gums, arabinans, galactans, and combinations thereof. Additionally, other synthetic fibers such as rayon, polyethylene, and polypropylene fibers can be used within the scope of the present invention. Further, such fibers may be latex bonded. Other materials are also intended to be within the scope of the present invention as long as they do not interfere or counteract any advantage presented by the instant invention.

In one embodiment the present invention may comprise a co-formed fibrous structure. A co-formed fibrous structure comprises a mixture of at least two different materials wherein at least one of the materials comprises a non-naturally occurring fiber, such as a polypropylene fiber, and at least one other material, different from the first material, comprises a solid additive, such as another fiber and/or a particulate. In one example, a co-formed fibrous structure comprises solid additives, such as naturally occurring fibers, such as wood pulp fibers, and non-naturally occurring fibers, such as polypropylene fibers.

Synthetic fibers useful herein include any material, such as, but not limited to, those selected from the group consisting of polyesters, polypropylenes, polyethylenes, polyethers, polyamides, polyhydroxyalkanoates, polysaccharides, and combinations thereof. The synthetic fiber may comprise a polymer. The polymer may be any material, such as, but not limited to, those materials selected from the group consisting of polyesters, polyamides, polyhydroxyalkanoates, polysaccharides and combinations thereof. More specifically, the material of the polymer segment may be selected from the group consisting of poly(ethylene terephthalate), poly(butylene terephthalate), poly(1,4-cyclohexylenedimethylene terephthalate), isophthalic acid copolymers (e.g., terephthalate cyclohexylene-dimethylene isophthalate copolymer), ethylene glycol copolymers (e.g., ethylene terephthalate cyclohexylene-dimethylene copolymer), polycaprolactone, poly(hydroxy ether ester), poly(hydroxy ether amide), polyesteramide, poly(lactic acid), polyhydroxybutyrate, and combinations thereof.

Further, the synthetic fibers can be a single component (i.e., single synthetic material or mixture makes up entire fiber), bi-component (i.e., the fiber is divided into regions, the regions including two or more different synthetic materials or mixtures thereof and may include co-extruded fibers) and combinations thereof. It is also possible to use bicomponent fibers, or simply bicomponent or sheath polymers. Nonlimiting examples suitable bicomponent fibers are fibers made of copolymers of polyester (polyethylene terephthalate)/polyester (polyethylene terephthalate) (otherwise known as "CoPET/PET" fibers), which are commercially available from Fiber Innovation Technology, Inc., Johnson City, Tenn.

These bicomponent fibers can be used as a component fiber of the structure, and/or they may be present to act as a binder for the other fibers present. Any or all of the synthetic fibers may be treated before, during, or after the process of the present invention to change any desired properties of the fibers. For example, in certain embodiments, it may be desirable to treat the synthetic fibers before or during the papermaking process to make them more hydrophilic, more wettable, etc.

These multicomponent and/or synthetic fibers are further described in U.S. Pat. Nos. 6,746,766, 6,946,506, and 6,890,872; U.S. Publication Nos. 2003/0077444A1, 2003/0168912A1, 2003/0092343A1, 2002/0168518A1, 2005/0079785A1, 2005/0026529A1, 2004/0154768A1, 2004/0154767, 2004/0154769A1, 2004/0157524A1, and 2005/0201965A1.

The fibrous structure may comprise a tissue-towel paper product known in the industry. Embodiment of these substrates may be made according U.S. Pat. Nos. 4,191,609, 4,300,981, 4,191,609, 4,514,345, 4,528,239, 4,529,480, 4,637,859, 5,245,025, 5,275,700, 5,328,565, 5,334,289, 5,364,504, 5,527,428, 5,556,509, 5,628,876, 5,629,052, 5,637,194, and 5,411,636; EP 677612; and U.S. Patent App. No. 2004/0192136A1.

The fibrous structure substrates may be manufactured via a wet-laid making process where the resulting web may be comprised of fibrous structure selected from the group consisting of: through-air-dried fibrous structure plies, differential density fibrous structure plies, wet laid fibrous structure plies, air laid fibrous structure plies, conventional fibrous structure plies, and combinations thereof.

Optionally, the fibrous structure substrate may be foreshortened by creping or by wet microcontraction. Creping and/or wet microcontraction are disclosed in U.S. Pat. Nos. 6,048,938, 5,942,085, 5,865,950, 4,440,597, 4,191,756, and 6,187,138.

Conventionally pressed tissue paper and methods for making such paper are known in the art. For example, U.S. Pat. No. 6,547,928. One suitable tissue paper is pattern densified tissue paper which is characterized by having a relatively high-bulk field of relatively low fiber density and an array of densified zones of relatively high fiber density. The high-bulk field is alternatively characterized as a field of pillow regions. The densified zones are alternatively referred to as knuckle regions. The densified zones may be discretely spaced within the high-bulk field or may be interconnected, either fully or partially, within the high-bulk field. Processes for making pattern densified tissue webs are disclosed in U.S. Pat. Nos. 3,301,746, 3,974,025, 4,191,609, 4,637,859, 3,301,746, 3,821,068, 3,974,025, 3,573,164, 3,473,576, 4,239,065, and 4,528,239.

Uncompacted, non pattern-densified fibrous structures are also contemplated within the scope of the present invention and are described in U.S. Pat. Nos. 3,812,000 and 4,208,459. Uncreped tissue paper as defined in the art is also contemplated. The techniques to produce uncreped tissue in this manner are taught in the prior art. For example, European Pat. App. Nos. 0 677 612A2, 0 617 164 A1, and U.S. Pat. No. 5,656,132.

The substrate which comprises the fibrous structure of the present invention may be cellulosic, non-cellulosic, or a combination of both. The substrate may be conventionally dried using one or more press felts or through-air dried. If the substrate which comprises the paper according to the present invention is conventionally dried, it may be conventionally dried using a felt which applies a pattern to the paper as taught by commonly assigned U.S. Pat. No. 5,556,509 and PCT Application WO 96/00812. The substrate which comprises the paper according to the present invention may also be through air dried. A suitable through air dried substrate may be made according to commonly assigned U.S. Pat. No. 4,191,609.

In one embodiment, the substrate which comprises the paper according to the present invention is through air dried on a belt having a patterned framework. The belt according to the present invention may be made according to any of commonly assigned U.S. Pat. Nos. 4,637,859 4,514,345, 5,328, 565, and 5,334,289. The belts that result from the belt making techniques disclosed in the referenced patents provide advantages over conventional belts in the art and are herein referred to as "resin coated woven belts."

In one embodiment, the patterned framework of the belt imprints a pattern comprising an essentially continuous network onto the paper and further has deflection conduits dispersed within the pattern. The deflection conduits extend between opposed first and second surfaces of the framework. The deflection conduits allow domes to form in the paper.

In one embodiment, the fibrous substrate is a through air dried paper made according to the foregoing patents and has a plurality of domes formed during the papermaking process which are dispersed throughout an essentially continuous network region. The domes extend generally perpendicular to the paper and increase its caliper. The domes generally correspond in geometry, and during papermaking in position, to the deflection conduits of the belt described above. There are an infinite variety of possible geometries, shapes, and arrangements for the deflection conduits and the domes formed in the paper there from. These shapes include those disclosed in commonly assigned U.S. Pat. No. 5,275,700. Examples of these shapes include, but are not limited to those described as a bow-tie pattern or snowflake pattern. Further examples of these shapes include, but are not limited to, circles, ovals, diamonds, triangles, hexagons, various quadrilaterals, and combinations thereof.

The domes that form the essentially continuous network of domes protrude outwardly from the plane of the paper due to molding into the deflection conduits during the papermaking process. By molding into the deflection conduits during the papermaking process, the regions of the paper comprising the domes are deflected in the Z-direction. For the embodiments described herein, such a paper may have between about 10 to about 1000 domes per square inch (i.e.; about 1.55 to about 155 domes per square centimeter.)

If the fibrous structure has domes, or other prominent features in the topography, the domes, or other prominent feature, may be arranged in a variety of different configurations. These configurations include, but are not limited to: regular arrangements, random arrangements, multiple regular arrangements, and combinations thereof.

In one embodiment of the present invention, the fibrous structure product has an embossment pattern is applied only to the first ply, and therefore, each of the two plies may serve different objectives and each ply is visually distinguishable. For instance, the embossment pattern on the first ply provides, among other things, improved aesthetics regarding thickness and quilted appearance, while the second ply, being unembossed, may be devised to enhance functional properties such as absorbency, thickness and strength.

The fibrous structure product according to the present invention having domes may be made according to commonly assigned U.S. Pat. Nos. 4,528,239, 4,529,480, 5,275, 700, 5,364,504, 5,527,428, 5,609,725, 5,679,222, 5,709,775, 5,795,440, 5,900,122, 5,906,710, 5,935,381, and 5,938,893.

In one embodiment the plies of the multi-ply fibrous structure may be the same substrate respectively or the plies may comprise different substrates combined to create desired consumer benefits. In one embodiment the fibrous structures comprise two plies of tissue substrate. In another embodiment the fibrous structure comprises a first ply, a second ply, and at least one inner ply.

A nonlimiting example of an embossed multi-ply fibrous 100 structure product in accordance with the present invention is shown in FIG. 1A. As shown in FIG. 1A, a fragmentary plan view of a ply of multi-ply fibrous structure product 100 displaying an embodiment of embossments 102 that define a non geometric foreground pattern 103 of unembossed cells 104 in which no two cells are defined by the same embossments 102 on the first ply or the second ply according to the present invention.

Figure 1B:
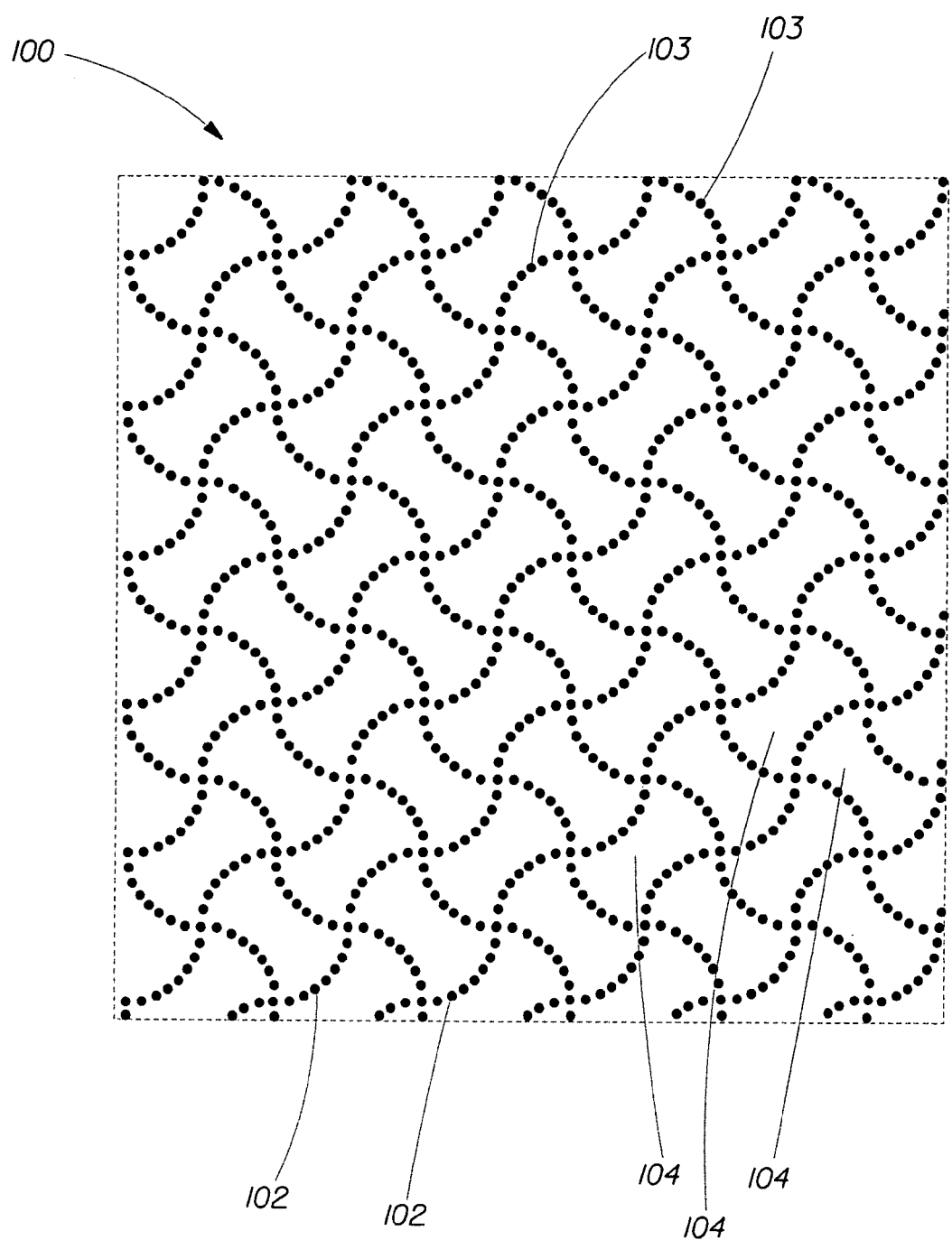
FIG. 1B is a fragmentary plan view of a multi-ply fibrous structure product displaying an embodiment of an embossment pattern that define cells on the first ply made according to the present invention.

Another nonlimiting example of an embossed multi-ply fibrous 100 structure product in accordance with the present invention is shown in FIG. 1B. As shown in FIG. 1B, a fragmentary plan view of a ply of multi-ply fibrous structure product 100 displaying an embodiment of embossments 102 that define a non geometric foreground pattern 103 of unembossed cells 104 in which no two cells are defined by the same embossments 102 on the first ply or the second ply according to the present invention. The embossments 102 define unembossed cells 104; wherein each cell 104 has a surface area of from about 0.4 in$^2$ to about 1.2 in$^2$. In another embodiment, each cell 104 has a surface area of from about 0.6 in$^2$ to about 1.0 in$^2$. In another embodiment, each cell 104 has a surface area of from about 0.7 in$^2$ to about 0.9 in$^2$. The cells 104 may have substantially similar surface areas. Alternatively, the cells may not have substantially similar surface areas. The cells 104 are not adhered to the adjacent ply. In one embodiment adjacent embossments 102 are discrete.

Figure 2A:
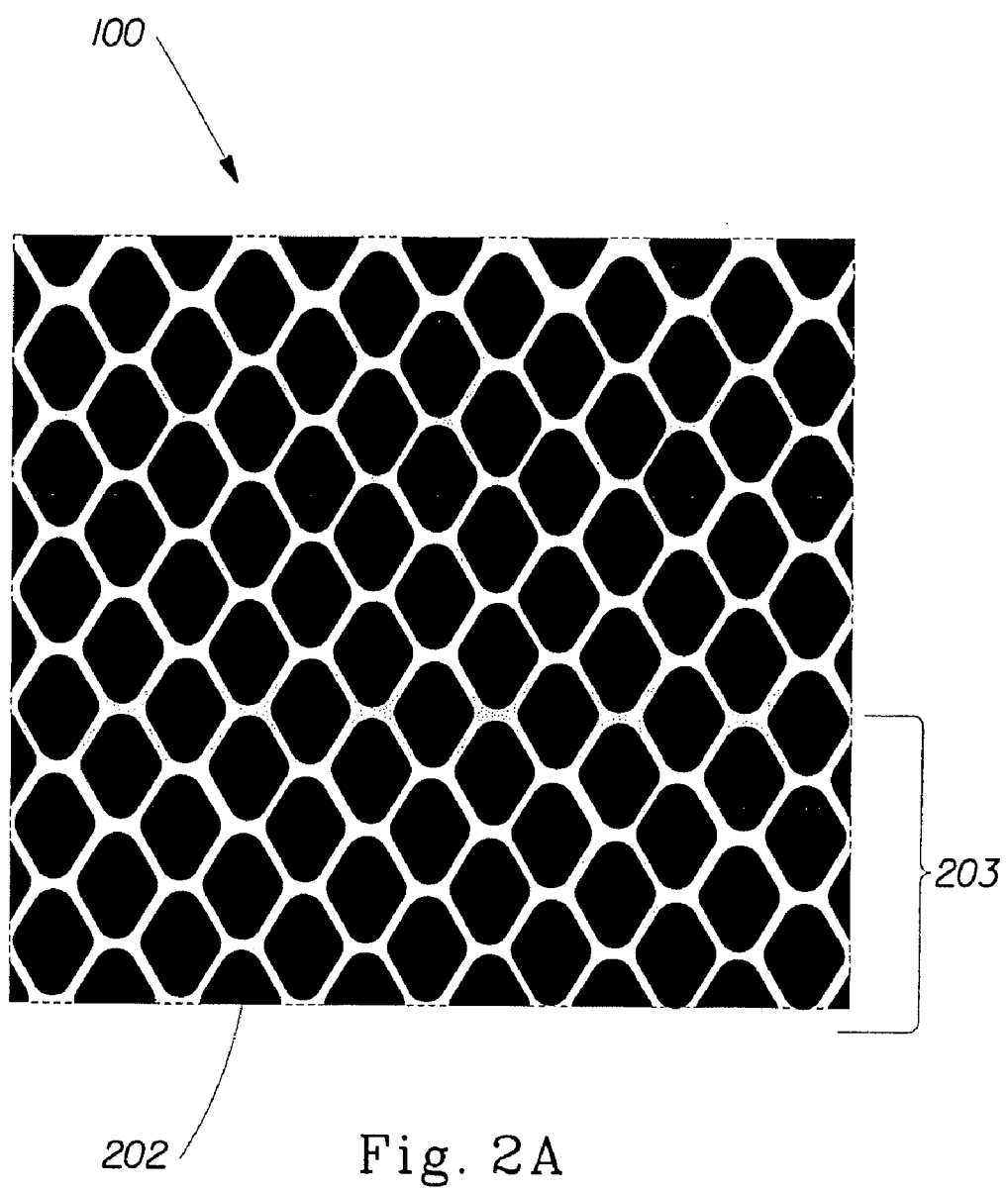
FIG. 2A is a fragmentary plan view of a fibrous structure product displaying an embodiment of the domed surface pattern on the plies made according to the present invention where the domes are in a regular arrangement.

Another nonlimiting example of a multi-ply fibrous structure product 100 in accordance with the present invention is shown in FIG. 2A. As shown in FIG. 2A, a fragmentary plan view of a ply of a multi-ply fibrous structure product 100 comprising two plies of fibrous structure wherein at least one of the piles has a plurality of domes 202 formed by a resin coated woven belt during the papermaking process and arranged in a regular arrangement 203. The multi-ply fibrous structure product 100 comprises from about 10 domes per in$^2$ to about 1000 domes per in$^2$ of the product. In another embodiment, the multi-ply fibrous structure 100 comprises from about 90 domes per in$^2$ to about 500 domes per in$^2$. In yet another embodiment the multi-ply fibrous structure 100 comprises from about 120 domes per in$^2$ to about 180 domes per in$^2$. In still another embodiment, the multi-ply fibrous structure 100 comprises about 150 domes per in$^2$.

Figure 2B:
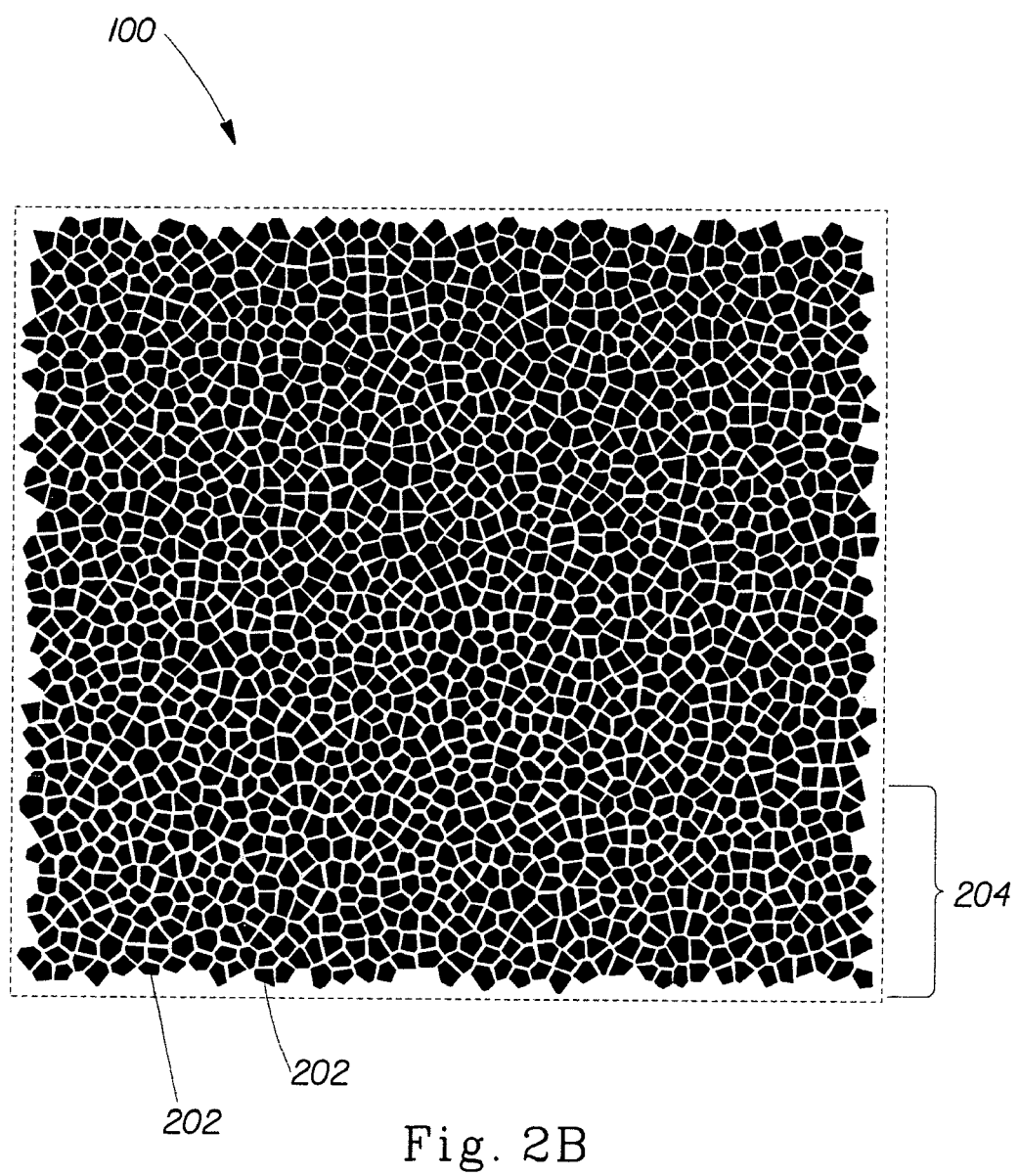
FIG. 2B is a fragmentary plan view of a fibrous structure product displaying an embodiment of the domed surface pattern of the plies made according to the present invention where the domes are in a random arrangement.

Another nonlimiting example of a multi-ply fibrous structure product 100 in accordance with the present invention is shown in FIG. 2B. As shown in FIG. 2B, a fragmentary plan view of a ply of a multi-ply fibrous structure 100 comprising two plies of fibrous structure wherein at least one of the piles has a plurality of domes 202 formed by a resin coated woven belt during the papermaking process and arranged in a random arrangement 204. The ply of the paper product 250 comprises from about 10 domes per in$^2$ to about 1000 domes per in$^2$ of the product. In another embodiment, the ply of the paper product 250 comprises from about 20 domes per in$^2$ to about 500 domes per in$^2$. In yet another embodiment, the ply of the paper product 250 comprises about 90 domes per in$^2$.

Figure 3A:
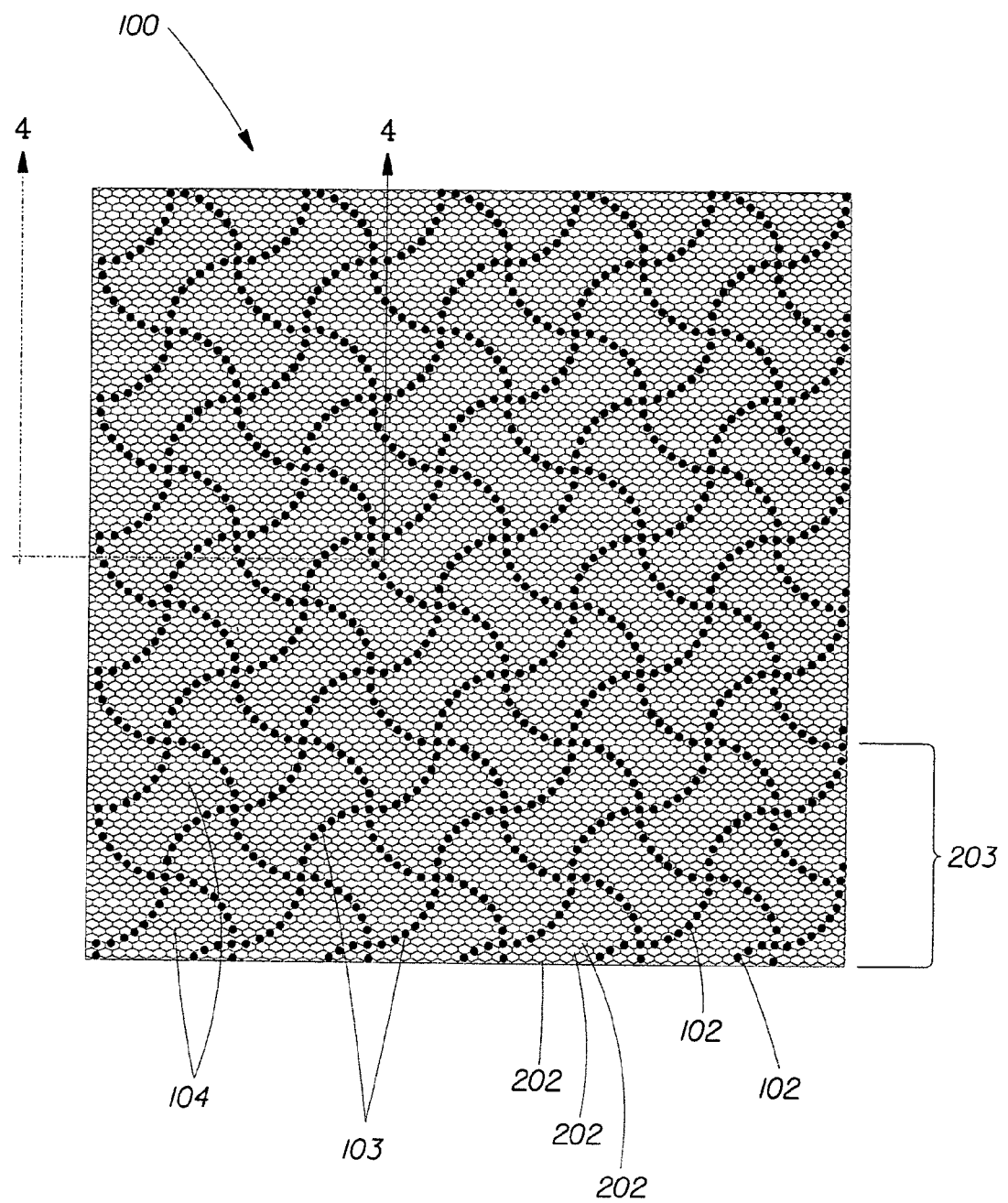
FIG. 3A is a fragmentary plan view of a multi-ply fibrous structure product displaying an embodiment of the present invention where the domes are in a regular arrangement and an embossment pattern that define a latticework of cells on the first ply made according to the present invention.

Another nonlimiting example of an embossed multi-ply fibrous structure product 100 in accordance with the present invention is shown in FIG. 3A. As shown in FIG. 3A, a fragmentary plan view of a ply of a multi-ply fibrous structure 100 comprising two plies of fibrous structure wherein at least one of the plies of the paper product has a plurality of domes 202 formed by a resin coated woven belt during the papermaking process and ordered in a regular arrangement 203 similar to that shown in FIG. 2A. The exemplary multi-ply fibrous structure 100 further comprises a non geometric foreground pattern 103 of embossments 102 on the first ply or the second ply similar to the pattern shown in FIG. 1B. The embossments 102 form a latticework defining a plurality of unembossed cells 104; wherein each cell comprises a plurality of domes 202 formed during the papermaking process.

Figure 3B:
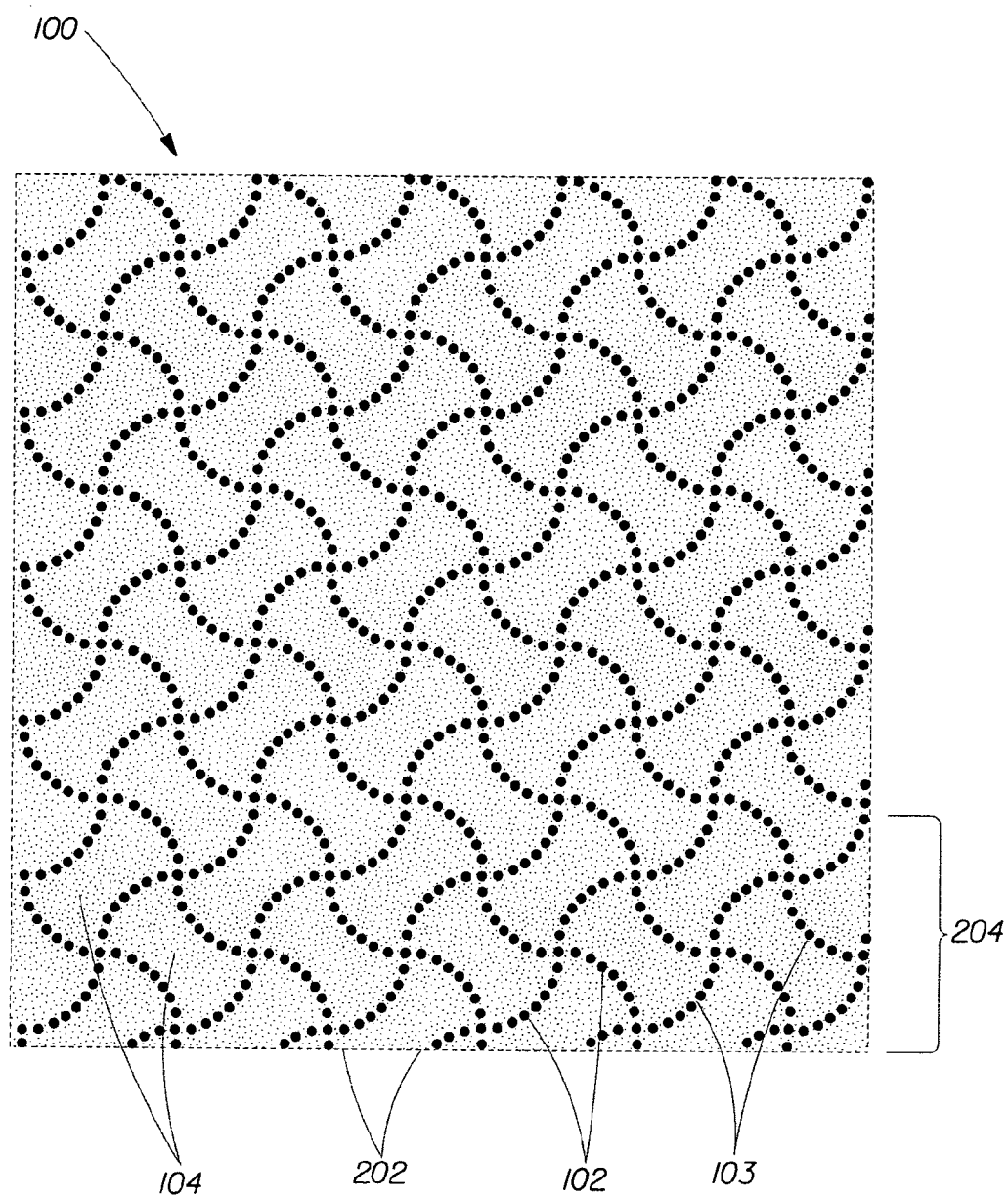
FIG. 3B is a fragmentary plan view of a multi-ply fibrous structure product displaying an embodiment of the present invention where the domes are in a random arrangement and an embossment pattern that define a latticework of cells on the first ply made according to the present invention.

Another nonlimiting example of an embossed multi-ply fibrous structure product 100 in accordance with the present invention is shown in FIG. 3B. As shown in FIG. 3B, a fragmentary plan view of a ply of a multi-ply fibrous structure product 100 comprising two plies of fibrous structure wherein at least one of the plies of the multi-ply fibrous structure 100 has a plurality of domes 202 formed by a resin coated woven belt during the papermaking process and ordered in a random arrangement 204 similar to that shown in FIG. 2B. The exemplary multi-ply fibrous structure 100 further comprises a non geometric foreground pattern 103 of embossments 102 similar to the pattern shown in FIG. 1B. The embossments 102 form a latticework defining a plurality of unembossed cells 104; wherein each cell comprises a plurality of domes 202 formed during the papermaking process.

Figure 4:
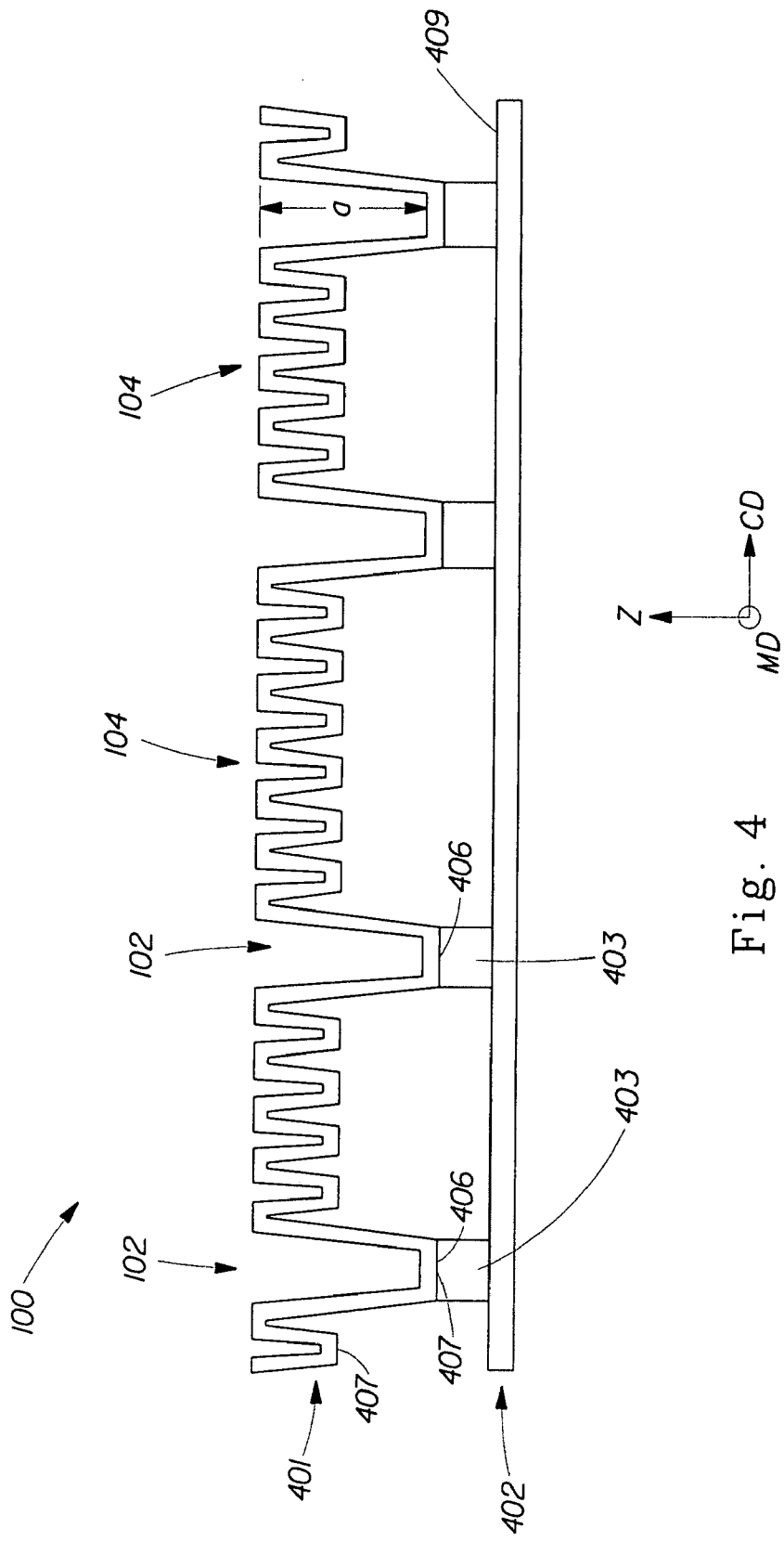
FIG. 4 is a cross sectional view of a portion of the multi-ply fibrous structure product shown in FIG. 3A as taken along line 4-4.

Another nonlimiting example of a multi-ply fibrous structure product 100 in accordance with cross section 4-4 of FIG. 3A is shown in FIG. 4. As shown in FIG. 4, the multi-ply fibrous structure product 100 comprises a first ply 401 and a second ply 402 that are bonded together by an adhesive 403 along the adjacent inside first-ply surface 407 and inside second-ply surface 409 at first-ply bond sites 406. The multi-ply fibrous structure product 100 further comprises embossments 102. The cells 104 exhibit an embossment height, a, of from about 300 µm to about 1500 µm. The embossment height a extends in the Z-direction which is perpendicular to the plane formed in the machine direction and the cross machine direction of the multi-ply fibrous structure product 100. In one embodiment of the present invention, the multi-ply fibrous structure product 100 comprises an embossment height a from about 300, 600, or 700 µm to about 1,500 µm, and in another embodiment from about 800 µm to about 1000 µm or to about 1,500 µm as measured by the GFM MikroCAD optical profiler instrument described herein. The bond sites 406 may be densified or non densified.

Because of the deformation caused by the embossments 102 of first ply 401, the extensibility of second ply 402 as compared to first ply 401 constrains first ply 401 from being elongated substantially in the cross machine direction plane of the paper product. Suitable means of embossing include those disclosed in U.S. Pat. Nos. 3,323,983, 5,468,323, 5,693,406, 5,972,466, 6,030,690 and 6,086,715.

The fibrous structures and/or embossed multi-ply fibrous structure product herein may optionally comprise one or more ingredients, such as softening agents, absorbency agents such as surfactants, wet strength agents, lotions, antibacterial agents, coloring agents, perfumes, and mixtures thereof. The multi-ply fibrous structure product may optionally comprise coloring agents, such as print elements. Further, the multi-ply fibrous structure product may be in roll form. When in roll form, the multi-ply fibrous structure product may be wound about a core or may be wound without a core.

As exemplified in FIGS. 1 and 3A-B, the embossments on the present invention multi-ply fibrous structure product 100 may be arranged to form a non geometric foreground pattern 103 or, in some embodiments, a curved latticework. The curved latticework of embossments can form an outline of a foreground pattern of unembossed cells within the latticework. The lines that substantially describe each segment of the outline of the foreground pattern of embossments that form the latticework can be, but are not limited to, curved, wavy, snaking, S-waves, and sinusoidal. The latticework may form regular or irregular patterns. In one embodiment of the present invention, the embossments on the paper of the present invention may be arranged to form one or more nongeometric foreground pattern of unembossed cells wherein no two cells are defined by the same embossments.

In one embodiment, the shapes of a plurality of lines that substantially define the latticework are horizontal S-waves or vertical S-waves. As used herein, a plurality of horizontal S-waves or vertical S-waves can be described mathematically. The mathematical relationship for one "set" of horizontal S-waves or vertical S-waves can be defined with the following two equations:

$$Y_1 = A\sin(X_{1,\,horizontal}) \pm CW$$

$$Y_2 = A\cos(X_{2,\,horizontal} + \pi/2) \pm (B+CW)$$

Wherein $Y_1$ and $Y_2$ are the amplitudes of a set of horizontal S-waves or vertical S-waves in the y-direction;

Wherein $X_1$ and $X_2$ are the horizontal positions of a set of horizontal S-waves or vertical S-waves measured in degrees.

Wherein W is a whole number.

Wherein the horizontal S-waves and the vertical S-waves are continuous in the positive and negative x-directions and span the entire surface of the multi-ply fibrous structure product.

A is the amplitude multiplier of the first set and second set (respectively) of horizontal S-waves or vertical S-waves. In one embodiment, A ranges from about 0.3 cm to about 0.7 cm. In another embodiment, A ranges from about 0.4 cm to about 0.6 cm. In yet another embodiment, A ranges from about 0.45 cm to about 0.55 cm. In still another embodiment, A is 0.5 cm.

B is the spacing between horizontal S-waves or vertical S-waves in a single set. In one embodiment, B ranges from about 2.75 cm to about 1.75 cm. In another embodiment, B ranges from about 2.5 cm to about 2 cm. In yet another embodiment, $B_2$ is 2.25 cm.

C is the displacement of the first set and second set (respectively) of horizontal S-waves or vertical S-waves. In one embodiment, C ranges from about 2 cm to about 7 cm. In another embodiment, C ranges from about 3 cm to about 6 cm. In yet another embodiment, C ranges from about 4 cm to about 5 cm. In still another embodiment, C is 4.5 cm.

In one embodiment, a full sine or cosine wave 360 degrees ($2\pi$ radians) ranges from about 6.5 cm to about 2.5 cm. In another embodiment, 360 degrees ($2\pi$) ranges from about 5.5 cm to about 3.5 cm. In yet another embodiment, 360 degrees ($2\pi$) is about is 4.5 cm.

The variables (A, B, and C) may be different, the same, or some combination thereof.

In one embodiment, W is chosen such that the sets of horizontal S-waves or vertical S-waves span the entire surface of the multi-ply fibrous structure product of the present invention. In another non-limiting embodiment, W is chosen such that the sets of S-waves do not span the entire surface of the multi-ply fibrous structure product of the present invention.

In the same embodiment, any part of the multi-ply fibrous structure product of the present invention can serve as the starting point for the plurality of horizontal S-waves or vertical S-waves. Further, the x-y axes used to mathematically define the plurality of horizontal S-waves or vertical S-waves do not necessarily have to be parallel to the edges of the multi-ply fibrous structure product of the present invention and can be defined arbitrarily. In a non-limiting embodiment of the invention, the x-axis of the horizontal S-waves or vertical S-waves are at a 45 degree angle ($\pi/4$) with the edge of the paper of the present invention.

In another non-limiting embodiment of the invention, the horizontal S-waves are continuous in the positive and negative x-direction such that the horizontal S-waves span the entire surface of the multi-ply fibrous structure product of the present invention. In another non-limiting embodiment, the horizontal S-waves do not span the entire surface of the multi-ply fibrous structure product of the present invention.

The multi-ply fibrous structure product of the present invention will have a total embossed area of about 15% or less, preferably about 10% or less, and most preferably about 6% or less or from about 3% to about 15%. The present invention defines a relationship between the size dimension (i.e., area) of the individual embossments and the total number of embossments (i.e., embossment frequency) per unit area of paper. This relationship, known as the E-factor is defined as follows:

$$E = S/N \times 100$$

Wherein E is the E factor

S is the area of the individual embossment

N is the number of embossments per unit area of paper

The multi-ply fibrous structure product of the present invention will have between about 5 to 25 embossments per square inch of paper (i.e., 0.775 to 3.875 embossments per square centimeter of paper). The multi-ply fibrous structure product of the present invention will have an E-factor of from about 0.0100 to about 3 in$^4$/number of embossments (i.e., about 0.416 to about 125 cm$^4$/number of embossments), and in another embodiment between about 0.0150 to about 1 in$^4$/number of embossments).

EXAMPLES

Example 1

One fibrous structure useful in achieving the multi-ply fibrous structure product of the present invention is the through-air-dried (TAD), differential density structure described in U.S. Pat. No. 4,528,239. Such a structure may be formed by the following process.

A Fourdrinier, through-air-dried papermaking machine is used. A slurry of papermaking fibers is pumped to the headbox at a consistency of about 0.15%. The slurry consists of about 70% Northern Softwood Kraft fibers, about 30% unrefined Eucalyptus fibers, a cationic polyamine-epichlorohydrin wet burst strength resin at a concentration of about 25 lbs per ton of dry fiber, and carboxymethyl cellulose at a concentration of about 5 lbs per ton of dry fiber, as well as DTDMAMS at a concentration of about 6 lbs per ton of dry fiber.

Dewatering occurs through the Fourdrinier wire and is assisted by vacuum boxes. The embryonic wet web is transferred from the Fourdrinier wire at a fiber consistency of about 20% at the point of transfer, to a TAD carrier fabric. The wire speed is about 620 feet per minute. The carrier fabric speed is about 600 feet per minute. Since the wire speed is faster than the carrier fabric, wet shortening of the web occurs at the transfer point. Thus, the wet web foreshortening is about 3%. The sheet side of the carrier fabric consists of a continuous, patterned network of photopolymer resin, the pattern containing about 150 deflection conduits or domes per square inch. The deflection conduits or domes are arranged in a regular arrangement, and the polymer network covers about 25% of the surface area of the carrier fabric. The polymer resin is supported by and attached to a woven support member. The photopolymer network rises about 18 mils above the support member.

The consistency of the web is about 60% after the action of the TAD dryers operating about a 400° F., before transfer onto the Yankee dryer. An aqueous solution of creping adhesive is applied to the Yankee surface by spray applicators before the location of the sheet transfer. The fiber consistency is increased to an estimated 95.5% before creping the web with a doctor blade. The doctor blade has a bevel angle of about 25 degrees and is positioned with respect to the Yankee dryer to provide an impact angle of about 81 degrees. The Yankee dryer is operated at about 360° F., and Yankee hoods are operated at about 350° F.

The dry, creped web is passed between two calendar rolls and rolled on a reel operated at 560 feet per minute so that there is about 7% foreshortening of the web by crepe.

The fibrous structure product described above is then subjected to a knob-to-rubber impression embossing process as follows. An emboss roll is engraved with a nonrandom pattern of protrusions. The emboss roll is mounted, along with a backside impression roll, in an apparatus with their respective axes being generally parallel to one another. The emboss roll comprises embossing protrusions which are frustaconical in shape. The backside impression roll is made of Valcoat™ material from Valley Roller Company, Mansfield, Tex. The fibrous structure product is passed through the nip to create an embossed ply.

The resulting fibrous structure product has domes arranged in a regular arrangement. There are about 150 domes per square inch; each dome has a surface area of about 0.005 square inches. The paper has circular embossments with a diameter of about 0.0628 inches. The embossments are arranged in a latticework of a horizontal and vertical S-waves such that the x-axis of the horizontal S-wave is parallel to the y-axis of the vertical S-wave. The x-axis of the horizontal S-waves is oriented at a 45 degree angle with an edge of the paper product of the present invention. The horizontal S-waves and the vertical S-waves of the present example are best described as follows:

$$Y_1 = 0.5 \sin(X) \pm 4.5 \; W$$

$$Y_2 = 0.5 \cos(X + \pi/2) \pm (2.25 + 4.5 \; W)$$

In the present example, a full sine or cosine wave (360 degrees, or $2\pi$ radians) spanned about 4.5 cm in the x-direction. Further, both the horizontal S-waves and the vertical S-waves are continuous in the positive and negative x-direction such that the S-waves span the entire surface of the paper product of the present invention. W is chosen such that the sets of S-waves span the entire surface of the paper product of the present invention. In the case of a 13.5 inch sheet of paper product, W ranges from 1 to 9.

Adhesive is applied to the embossments of the paper, and a second, unembossed paper ply is joined with the embossed outward facing ply together at a zero clearance marrying nip, so that a unitary laminate is formed.

Example 2

One fibrous structure useful in achieving the multi-ply fibrous structure product of the present invention is the through-air-dried (TAD), differential density structure described in U.S. Pat. No. 4,528,239. Such a structure may be formed by the following process.

A Fourdrinier, through-air-dried papermaking machine is used. A slurry of papermaking fibers is pumped to the headbox at a consistency of about 0.15%. The slurry consists of about 70% Northern Softwood Kraft fibers, about 20% unrefined Eucalyptus fibers, and about 10% of bicomponent fibers of copolymers of polyester (polyethylene terephthalate)/polyester (polyethylene terephthalate) such as "CoPET/PET" fibers, which are commercially available from Fiber Innovation Technology, Inc., Johnson City, Tenn. The slurry further comprises a cationic polyamine-epichlorohydrin wet burst strength resin at a concentration of about 25 lbs per ton of dry fiber, and carboxymethyl cellulose at a concentration of about 5 lbs per ton of dry fiber, as well as DTDMAMS at a concentration of about 6 lbs per ton of dry fiber.

Dewatering occurs through the Fourdrinier wire and is assisted by vacuum boxes. The embryonic wet web is transferred from the Fourdrinier wire at a fiber consistency of about 24% at the point of transfer, to a TAD carrier fabric. The wire speed is about 620 feet per minute. The carrier fabric speed is about 600 feet per minute. Since the wire speed is faster than the carrier fabric, wet shortening of the web occurs at the transfer point. Thus, the wet web foreshortening is about 3%. The sheet side of the carrier fabric consists of a continuous, patterned network of photopolymer resin, the pattern containing about 150 deflection conduits or domes per square inch. The deflection conduits or domes are arranged in a regular arrangement, and the polymer network covers about 25% of the surface area of the carrier fabric. The polymer resin is supported by and attached to a woven support member. The photopolymer network rises about 18 mils above the support member.

The consistency of the web is about 72% after the action of the TAD dryers operating about a 350° F., before transfer onto the Yankee dryer. An aqueous solution of creping adhesive is applied to the Yankee surface by spray applicators before location of sheet transfer. The fiber consistency is increased to an estimated 97% before creping the web with a doctor blade. The doctor blade has a bevel angle of about 25 degrees and is positioned with respect to the Yankee dryer to provide an impact angle of about 81 degrees. The Yankee dryer is operated at about 500° F., and Yankee hoods are operated at about 380° F.

The dry, creped web is passed between two calendar rolls and rolled on a reel operated at 560 feet per minute so that there is about 7% foreshortening of the web by crepe.

The fibrous structure product described above is then subjected to a knob-to-rubber impression embossing process as follows. An emboss roll is engraved with a nonrandom pattern of protrusions. The emboss roll is mounted, along with a backside impression roll, in an apparatus with their respective axes being generally parallel to one another. The emboss roll comprises embossing protrusions which are frustaconical in shape. The backside impression roll is made of Valcoat™ material from Valley Roller Company, Mansfield, Tex. The paper web is passed through the nip to create an embossed ply.

The resulting paper has domes arranged in a regular arrangement. There are about 150 domes per square inch; each dome has a surface area of about 0.005 square inches. The paper has circular embossments with a diameter of about 0.0628 inches. The embossments are arranged in a latticework of horizontal and vertical S-waves such that the x-axis of the horizontal S-wave is parallel to the y-axis of the vertical S-wave. The x-axis of the horizontal S-waves is oriented at a 45 degree angle with an edge of the paper product of the present invention. The horizontal S-waves and the vertical S-waves of the present example are best described as follows:

$$Y_1 = 0.5 \sin(X) \pm 4.5 \ W$$

$$Y_2 = 0.5 \cos(X + \pi/2) \pm (2.25 + 4.5 \ W)$$

In the present example, a full sine or cosine wave (360 degrees, or $2\pi$ radians) spanned about 4.5 cm in the x-direction. Further, both the horizontal S-waves and the vertical S-waves are continuous in the positive and negative x-direction such that the S-waves span the entire surface of the paper product of the present invention. W is chosen such that the sets of S-waves span the entire surface of the paper product of the present invention. In the case of a 13.5 inch sheet of fibrous structure product, W ranges from 1 to 9.

Adhesive is applied to the embossments of the fibrous structure, and a second, unembossed ply is joined with the embossed outward facing ply together at a zero clearance marrying nip, so that a unitary laminate is formed.

Test Methods

The following describe the test methods utilized herein to determine the values consistent with those presented herein.

Embossment Structure Measurement Method

The geometric characteristics of the embossment structure of the present invention are measured using an Optical 3D Measuring System MikroCAD compact for paper measurement instrument (the "GFM MikroCAD optical profiler instrument") and ODSCAD Version 4.14 software available from GFMesstechnik GmbH, Warthestraβe E21, D14513 Teltow, Berlin, Germany. The GFM MikroCAD optical profiler instrument includes a compact optical measuring sensor based on digital micro-mirror projection, consisting of the following components:

A) A DMD projector with 1024×768 direct digital controlled micro-mirrors.
B) CCD camera with high resolution (1280×1024 pixels).
C) Projection optics adapted to a measuring area of at least 160×120 mm.
D) Recording optics adapted to a measuring area of at least 160×120 mm;
E) Schott KL1500 LCD cold light source.
F) A table stand consisting of a motorized telescoping mounting pillar and a hard stone plate;
G) Measuring, control and evaluation computer.
H) Measuring, control and evaluation software ODSCAD 4.14.
I) Adjusting probes for lateral (XY) and vertical (Z) calibration.

The GFM MikroCAD optical profiler system measures the height of a sample using the digital micro-mirror pattern projection technique. The result of the analysis is a map of surface height (Z) versus XY displacement. The system should provide a field of view of 160×120 mm with an XY resolution of 21 µm. The height resolution is set to between 0.10 µm and 1.00 µm. The height range is 64,000 times the resolution. To measure a fibrous structure sample, the following steps are utilized:

1. Turn on the cold-light source. The settings on the cold-light source are set to provide a reading of at least 2,800 k on the display.
2. Turn on the computer, monitor, and printer, and open the software.
3. Verify calibration accuracy by following the manufacturer's instructions.
4. Select "Start Measurement" icon from the ODSCAD task bar and then click the "Live Image" button.
5. Obtain a fibrous structure sample that is larger than the equipment field of view and conditioned at a temperature of 73° F.±2° F. (about 23° C.±1° C.) and a relative humidity of 50%±2% for 2 hours. Place the sample under the projection head. Position the projection head to be normal to the sample surface.

6. Adjust the distance between the sample and the projection head for best focus in the following manner. Turn on the "Show Cross" button. A blue cross should appear on the screen. Click the "Pattern" button repeatedly to project one of the several focusing patterns to aid in achieving the best focus. Select a pattern with a cross hair such as the one with the square. Adjust the focus control until the cross hair is aligned with the blue "cross" on the screen.
7. Adjust image brightness by increasing or decreasing the intensity of the cold light source or by altering the camera gains setting on the screen. When the illumination is optimum, the red circle at the bottom of the screen labeled "I.O." will turn green.
8. Select "Standard" measurement type.
9. Click on the "Measure" button. The sample should remain stationary during the data acquisition.
10. To move the data into the analysis portion of the software, click on the clipboard/man icon.
11. Click on the icon "Draw Cutting Lines." On the captured image, "draw" a cutting line that extends from the center of a negative embossment through the centers of at least six negative embossments, ending on the center of a final negative embossment. Click on the icon "Show Sectional Line Diagram." Move the cross-hairs to a representative low point on one of the left hand negative embossments and click the mouse. Then move the cross-hairs to a representative low point on one of the right hand negative embossments and click the mouse. Click on the "Align" button by marked point's icon. The Sectional Line Diagram is now adjusted to the zero reference line.
12. Measurement of Emboss Height, "a". Using the Sectional Line Diagram described in step 11, click the mouse on a representative low point of a negative emboss, followed by clicking the mouse on a representative point on the nearby upper surface of the sample. Click the "Vertical" distance icon. Record the distance measurement. Repeat the previous steps until the depth of six negative embossments have been measured. Take the average of all recorded numbers and report in mm, or µm, as desired. This number is the embossment height.
13. Measurement of Emboss Area, A. Using the Sectional Line Diagram of step 11, select with the mouse two points on each wall of a negative embossment that represents 50% of the depth measured in step 12. Click the "horizontal distance" icon. The horizontal distance is the diameter of an equivalent circle. The area of that circle is calculated using the formula Area=$2\pi$ $(d/2)^2$ and is recorded as the Equivalent Emboss Area. If the embossment shape is elliptical or irregular, more sectional lines are needed, cutting through the embossment from different directions, to calculate the equivalent area. Repeat these steps for the six negative embossments measured in step 12.
14. These measurements are represented schematically in FIG. 5.

Alternative Method for Determining the Area of the Individual Embossment

Embossments are often based on standard plane geometry shapes such as circles, ovals, various quadrilaterals and the like, both alone and in combination. For such plane geometry figures, the area of an individual embossment can be readily derived from well known mathematical formulas. For more complex shapes, various area calculation methods may be used. One such technique follows. Start with an image of a single embossment at a known magnification of the original (for example 100×) on an otherwise clean sheet of paper, cardboard or the like. Calculate the area of the paper and weigh it. Cut out the image of the embossment and weigh it. With the known weight and size of the whole paper, and the known weight and magnification of the embossment image, the area of the actual embossment may be calculated as follows:

$$\text{Embossment Area} = \frac{(EmbossmentImageWeight/PaperWeight)(PaperArea)}{Magnification^2}$$

Basis Weight Method

Basis weight is measured by preparing one or more samples of a certain area ($m^2$) and weighing the sample(s) of a fibrous structure according to the present invention and/or a fibrous structure product comprising such fibrous structure on a top loading balance with a minimum resolution of 0.01 g. The balance is protected from air drafts and other disturbances using a draft shield. Weights are recorded when the readings on the balance become constant. The average weight (g) is calculated and the average area of the samples ($m^2$). The basis weight ($g/m^2$) is calculated by dividing the average weight (g) by the average area of the samples ($m^2$). This method is herein referred to as the Basis Weight Method.

All measurements referred to herein are made at 25° C. unless otherwise specified.

All publications, patent applications, and issued patents mentioned herein are hereby incorporated in their entirety by reference. Citation of any reference is not an admission regarding any determination as to its availability as prior art to the claimed invention.

Herein, "comprising" means the term "comprising" and can include "consisting of" and "consisting essentially of."

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm".

All documents cited in the Detailed Description of the Invention are, in relevant part, incorporated herein by reference; the citation of any document is not to be construed as an admission that it is prior art with respect to the present invention. To the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A multi-ply fibrous structure product comprising:

two or more plies of fibrous structure wherein at least one of the plies comprises a plurality of domes formed during the papermaking process wherein the ply comprises from about 10 to about 1000 domes per square inch of the ply;

wherein at least one of the plies has a plurality of embossments thereon having a total embossment area of from about 3% to about 15%; and wherein the embossments form a non-geometric latticework of repeating sets of horizontal S-waves and repeating sets of vertical S-waves wherein a set of the horizontal S-waves or a set of the vertical S-waves are described by the following equation:

$$Y_1 = A \sin(X_{1,\ horizontal}) \pm CW$$

$$Y_2 = A \cos(X_{2,\ horizontal} + \pi/2) \pm (B + CW)$$

wherein $Y_1$ and $Y_2$ are the amplitudes of a set of horizontal S-waves or vertical S-waves in the y-direction;

wherein $X_1$ and $X_2$ are the horizontal positions of a set of horizontal S-waves or vertical S-waves measured in degrees;

wherein W is a whole number;

wherein the horizontal S-waves and the vertical S-waves are continuous in the positive and negative x-directions;

wherein A ranges from about 0.3 cm to about 0.7 cm;

wherein B ranges from about 2.75 cm to about 1.75 cm;

wherein C ranges from about 2 cm to about 7 cm;

wherein a full sine or cosine wave ranges from about 6.5 cm to about 2.5 cm.

2. The product of claim 1 wherein a set of the horizontal S-waves or a set of the vertical S-waves.

3. The product of claim 2 wherein the variables (A, B, C) of the horizontal S waves and vertical S-waves are different.

4. The product of claim 2 wherein the variables (A, B, C) of the horizontal S-waves and vertical S-waves are the same.

5. The product of claim 2 wherein the x-axes of the horizontal S-waves are perpendicular to the x-axes of the vertical S-waves.

6. The product of claim 1 wherein the domes are formed in the papermaking process with a resin coated woven belt.

7. The product of claim 1 wherein the cells have a substantially similar surface area.

8. The product of claim 1 wherein the cells have a surface area of from about 0.05 in$^2$ to about 1.2 in$^2$.

9. The product of claim 8 wherein the cells have a surface area of from about 0.4 in$^2$ to about 0.9 in$^2$.

10. The product of claim 1 wherein cells in one ply are not adhered to an adjacent ply.

11. The product of claim 1 wherein there are from about 120 to about 180 domes per square inch.

12. The product of claim 11 wherein the arrangement of the domes is selected from the group consisting of: regular arrangements, random arrangements, multiple regular arrangements, and combinations thereof.

13. The product of claim 1 wherein at least one of the plies of fibrous structure comprises a fibrous structure selected from the group consisting of: through-air-dried fibrous structure plies, differential density fibrous structure plies, wet laid fibrous structure plies, air laid fibrous structure plies, conventional wet press fibrous structure plies, and combinations thereof.

14. The product of claim 1 further comprising an E factor from about 0.0100 to about 3 in$^4$/number of embossments.

15. The product of claim 14 wherein the E factor is from about 0.0150 to about 1 in$^4$/number of embossments.

16. The product of claim 1 wherein the embossments comprise a height of from about 700 μm to about 1500 μm.

* * * * *